UNITED STATES PATENT OFFICE.

SAMUEL W. ANDREWS AND LEWIS GODFREY, OF GREENEVILLE, ASSIGNORS OF ONE-HALF THEIR RIGHT TO O. G. VANDERHOOF, OF KNOXVILLE, TENNESSEE.

IMPROVEMENT IN COMPOSITIONS OF RUBBER FOR USE IN SEPARATING COCKLES FROM GRAIN.

Specification forming part of Letters Patent No. 146,158, dated January 6, 1874; application filed July 26, 1873.

*To all whom it may concern:*

Be it known that we, SAMUEL W. ANDREWS and LEWIS GODFREY, of Greeneville, of Greene county and State of Tennessee, have made certain improvements in vulcanized rubber, which we propose to use as a means of separating cockle from grain; and we do hereby declare that the following is a full and exact description thereof.

When the improved rubber is pressed on a mixture of cockle and grain by any well-known mechanical means, the cockle will adhere to the rubber from its angular character, while the grain, from its smoothness, will remain.

To enable others skilled in the art to make and use our invention, we shall proceed to describe our mode of compounding and preparing the same.

The composition we use consists of the following materials, viz: Eight ounces of pure linseed-oil and about two ounces of chalk, (carbonate of lime;) eight pounds of zinc-white, (oxide;) and four pounds of rubber gum, containing sufficient sulphur or its equivalent to vulcanize the compound when submitted to the temperatures described.

The compound must be well mixed, after which it is subjected to a vulcanizing-temperature of about 260° Fahrenheit. Experience shows that if the above composition is subjected longer than three hours at a temperature of 260° Fahrenheit the composition will not serve the purposes desired. We next subject the rubber compound to a temperature of 212° Fahrenheit, more or less, for a period of about two hours, when the compound will possess the properties desired. It will then have a semi-elastic character, and yet durable.

The angular forms of the cockle will be held by the rubber when pressed onto it, while the smooth grain will bound off, and will, in this way, separate all the cockle from the grain.

What we claim is—

The composition of materials herein described, when combined and prepared in the manner substantially as set forth.

SAMUEL W. ANDREWS.
LEWIS GODFREY.

Attest:
A. W. WALKER,
J. C. WILSON.